US008868792B2

(12) United States Patent
Schultz et al.

(10) Patent No.: US 8,868,792 B2
(45) Date of Patent: Oct. 21, 2014

(54) DEVICES AND METHODS FOR ENABLING USB COMMUNICATION OVER EXTENSION MEDIA

(71) Applicant: Icron Technologies Corporation, Burnaby (CA)

(72) Inventors: Thomas Aaron Schultz, Surrey (CA); Karan Jagitkumar, Surrey (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 13/844,031

(22) Filed: Mar. 15, 2013

(65) Prior Publication Data

US 2014/0281039 A1   Sep. 18, 2014

(51) Int. Cl.
*G06F 3/00* (2006.01)
*G06F 13/12* (2006.01)
*G06F 13/38* (2006.01)

(52) U.S. Cl.
CPC .................................... *G06F 13/385* (2013.01)
USPC .................................... 710/2; 710/30; 710/65

(58) Field of Classification Search
None
See application file for complete search history.

(56) References Cited

U.S. PATENT DOCUMENTS 7,424,229 B2   9/2008   Effenberger
8,000,278 B2   8/2011   Costo 8,184,758 B2   5/2012   Maroni
2004/0205276 A1   10/2004   Ferguson
2006/0020736 A1   1/2006   Jackson

OTHER PUBLICATIONS

"8.5 GB/s Short-Wavelength SFP+Transceiver: FTLF8528P3BxV," Product Specification, Finisar Corporation, Sunnyvale, Calif, Jan. 25, 2011, Rev. A.3, pp. 1-12.
"Universal Serial Bus 3.0 Specification (Including Errata and ECNs Through May 1, 2011)," Revision 1.0, Jun. 6, 2011, 531 pages.
International Search Report and Written Opinion mailed Jun. 5, 2014, issued in corresponding International Application No. PCT/CA2014/000232, filed Mar. 13, 2014, 9 pages.
Hewlett-Packard et al., "Universal Serial Bus 3.0 Specification," Revision 1.0, Nov. 12, 2008, 482 pages.

*Primary Examiner* — Zachary K Huson
(74) *Attorney, Agent, or Firm* — Christensen O'Connor Johnson Kindness PLLC

(57) ABSTRACT

USB extension devices that transmit USB 3.0 differential signaling over an extension medium that supports serial communication are provided. In some embodiments, an electrical idle or suspend is detected from a transmit conductor of a USB host or device, and a corresponding USB extension device is reconfigured to couple a receive conductor of the USB host or device to a null data source instead of an extension medium transceiver. Once the electrical idle or suspend state ceases, the receive conductor of the USB host or device is reconnected to the extension medium transceiver. In some embodiments, a transmit input of the extension medium transceiver is coupled to a null data source upon detection of electrical idle or suspend from the USB host or device.

20 Claims, 9 Drawing Sheets

DEVICES AND METHODS FOR ENABLING USB COMMUNICATION OVER EXTENSION MEDIA

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.0 of the USB Specifications, SuperSpeed connections are provided that use a 5 Gbps signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, new methods and apparatuses are needed to optionally allow for extension of a SuperSpeed USB device to a greater distance from the host to which it is coupled, such that SuperSpeed USB packets may be propagated between the host and the USB device, and such that SuperSpeed connections may be maintained between the host and the USB device even if the host and/or the device enter an idle or suspend state.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a USB extension device is provided. The USB extension device comprises a USB port, an extension medium transceiver, and a multiplexer. The extension medium transceiver is configured to receive outgoing differential signals from the USB port, to transmit outgoing signals representing the outgoing differential signals over an extension medium, and to receive incoming signals from the extension medium representing incoming differential signals. The multiplexer is selectively configurable to transmit the incoming differential signals from the extension medium transceiver to the USB port while configured in a first state, and to transmit a signal from a null data source to the USB port while configured in a second state.

In some embodiments, a method implemented in a USB extension device of translating USB signals for transmission to and reception from an extension medium is provided. The USB extension device is coupled via a USB port to a device. The method comprises coupling a data receive differential pair of the USB port to a null data source in response to determining that the device is in a suspend state, and coupling the data receive differential pair of the USB port to a data receive output of an extension medium transceiver in response to determining that either the device coupled to the USB port is not in the suspend state, or that a valid signal is being received from the extension medium.

In some embodiments, a USB extension device is provided that comprises a USB port and logic circuitry configured to cause a null signal to be presented to an extension medium transceiver for transmission over an extension medium in response to detecting an electrical idle differential signal from the USB port.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
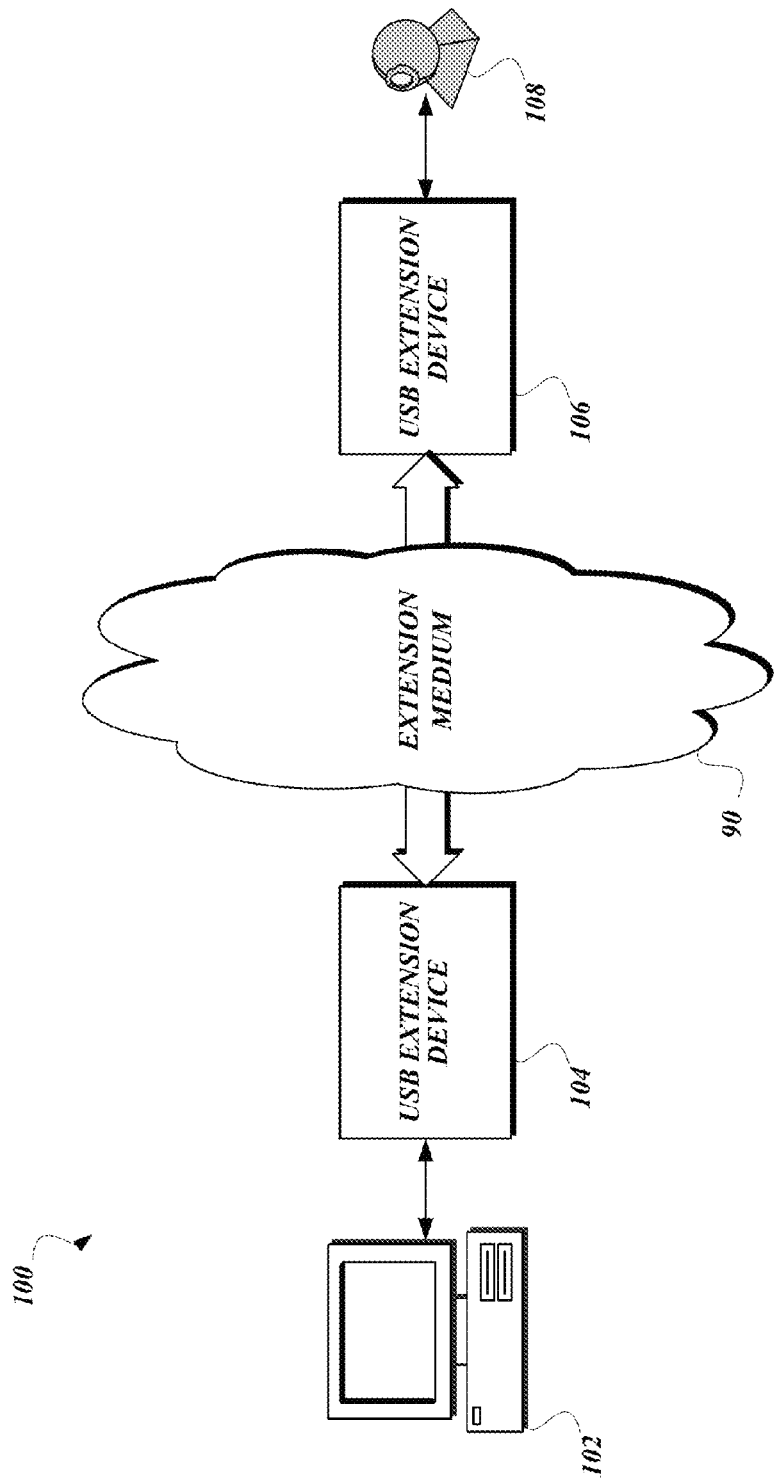
FIG. 1 is a block diagram that illustrates an exemplary embodiment of a system for extending USB communication according to various embodiments of the present disclosure.

FIG. 1 is a block diagram that illustrates an exemplary embodiment of a system 100 for extending USB communication according to various embodiments of the present disclosure. The system 100 includes a host device 102 and a USB device 108. Traditionally, the host device 102 and the USB device 108 would be directly connected via a USB cable, and would communicate directly with one another via a protocol that conforms to a USB Specification, such as USB 1.0, USB 1.1, USB 2.0, or USB 3.0. As discussed above, such a connection would be limited to a short distance between the host device 102 and the USB device 108 due to the timing requirements of the USB Specifications.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a wireless controller, and/or the like. In some embodiments, the host device 102 may be replaced by any USB device providing a downstream facing port (including USB hubs and/or the like), and/or the USB device 108 may be replaced by any USB device providing an upstream facing port (including USB hubs and/or the like).

In the present system 100, the host device 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via an extension medium 90 that may increase the distance between the host device 102 and the USB device 108 beyond that supported by the USB Specification. The extension medium 90 and communication thereon may include any suitable communication technology, such as fiber optic cabling, Ethernet, Bluetooth, WiFi, WiMax, the Internet, and/or the like, and any suitable communication medium, such as via physical cables, via wireless spectrum, and/or the like.

In some embodiments, the upstream USB extension device 104 and the downstream USB extension device 106 may happen to be closer to each other than the short USB requirement distance, but retain the capability of communicating over the non-USB compatible extension medium 90 as described further below.

Figure 2:
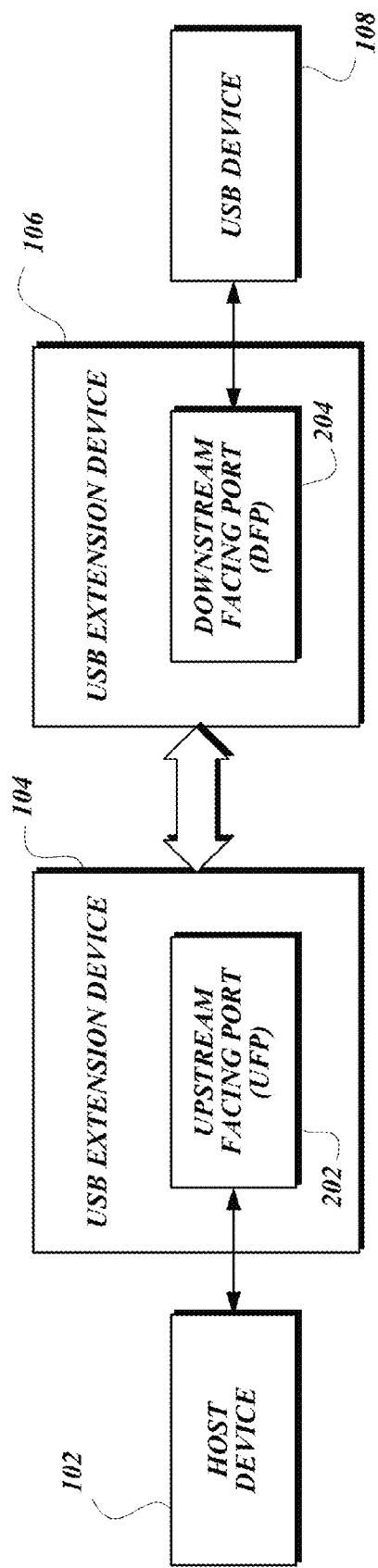
FIG. 2 is a block diagram that illustrates further details of the upstream USB extension device and downstream USB extension device illustrated in FIG. 1.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." The UFP 202 is configured at least to communicate with the host device 102 via a USB-standard-compliant protocol, and to exchange messages and USB bus traffic with the DFP 204. The DFP 204 is configured at least to communicate with the USB device 108 via a USB-standard-compliant protocol, and to exchange messages and USB bus traffic with the UFP 202. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of a host device 102, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host, such as a downstream facing port of a hub and/or the like. Likewise, in other embodiments, the downstream facing port 204 of the downstream USB extension device 106 may be connected to an upstream facing port other than one provided by a USB device 108, such as an upstream facing port of a hub and/or the like. The discussion below is primarily in terms of the simple topology illustrated in FIG. 2, but one of ordinary skill in the art will recognize that in some embodiments similar techniques may be used in other topologies without departing from the scope of the present disclosure.

Some techniques for extending USB communication over longer distances than those supported by the USB Specifications via a topology similar to that illustrated in FIGS. 1 and 2 have been developed. For example, commonly owned, co-pending U.S. patent application Ser. No. 13/683,993, hereby incorporated herein by reference in its entirety for all purposes, discloses, among other things, various techniques for providing an upstream facing port device and a downstream facing port device that communicate via non-USB communication channel to provide extended distance communication for a host device and a USB device. However, it has been discovered that certain problems may arise, depending on the technologies chosen to convert the USB signals to a format suitable for transmission over the extension medium. For example, in some embodiments, USB-compliant communication is encoded per the USB Specifications as signaling over a differential pair. Problems may arise when this differential signaling is converted to digital signaling for transmission over an extension medium that uses serial transmission such as fiber optic cable, coaxial cable, and/or the like, as discussed below.

Figure 3A:
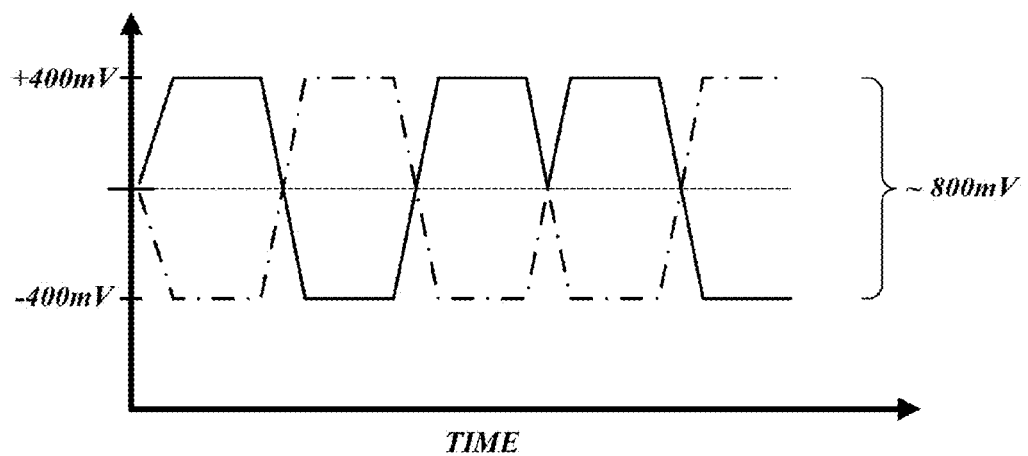
FIGS. 3A and 3B are charts that illustrate proper conversion of differential signaling to digital logic signaling, according to various aspects of the present disclosure.
Figure 3B:
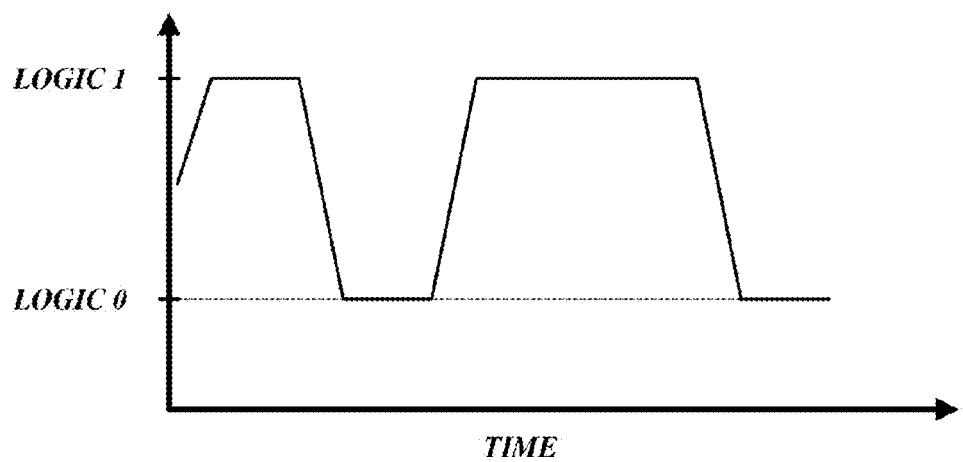

FIGS. 3A and 3B are charts that illustrate proper conversion of differential signaling to digital logic signaling, according to various aspects of the present disclosure. In FIG. 3A, the horizontal axis indicates passing time, while the vertical axis indicates a voltage. The horizontal dashed line indicates a base voltage, while the solid wave line and the dashed wave line indicate voltages presented on each of a pair of differential conductors. As understood by one of ordinary skill in the art, a voltage of the conductor represented by the solid wave line higher than a voltage of the conductor represented by the dashed wave line may represent a logical "1" or "true" value, while a voltage of the conductor represented by the solid wave line lower than a voltage of the conductor represented by the dashed wave line may represent a logical "0" or "false" value. In one typical embodiment, logical values are presented when the difference in voltage between the differential pair conductors is about 800 mV, as shown in the graph.

FIG. 3B illustrates a typical conversion of the differential signals illustrated in FIG. 3A to a digital signal, such as a signal transmitted by an optical transceiver that receives the differential signals illustrated in FIG. 3A as input to be converted for transmission over a fiber optic cable. The horizontal axis of FIG. 3B again symbolizes passing time, while the vertical axis of FIG. 3B symbolizes a logical value output by the optical transceiver over the fiber optic cable. Because the differential signals clearly transition between logical "1" states and logical "0" states, and substantially maintain a significant differential voltage, the output of the optical transceiver illustrated in FIG. 3B closely matches the intended logical values represented by the differential signals.

Figure 4A:
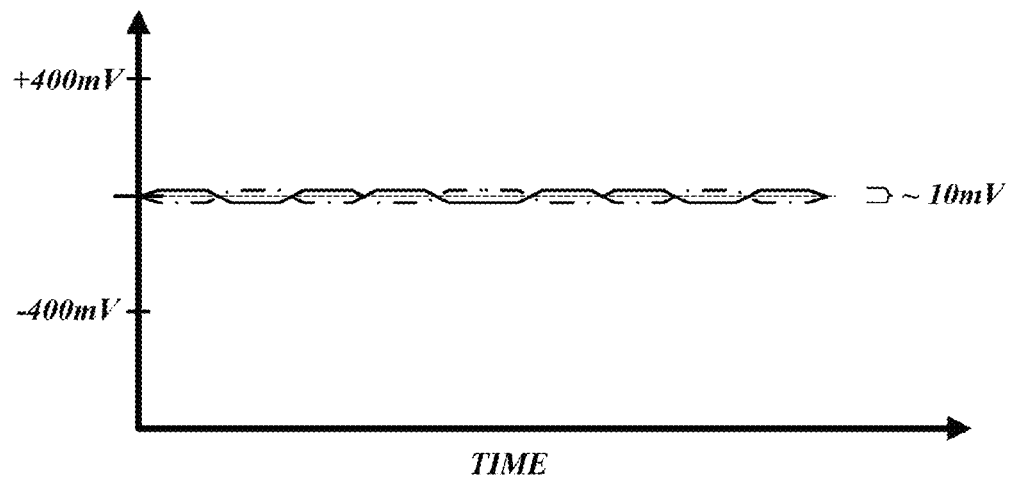
FIGS. 4A and 4B are charts that illustrate a problem that may occur when electrical idle is presented by a differential pair that is being converted to digital logic signaling, according to various aspects of the present disclosure.
Figure 4B:
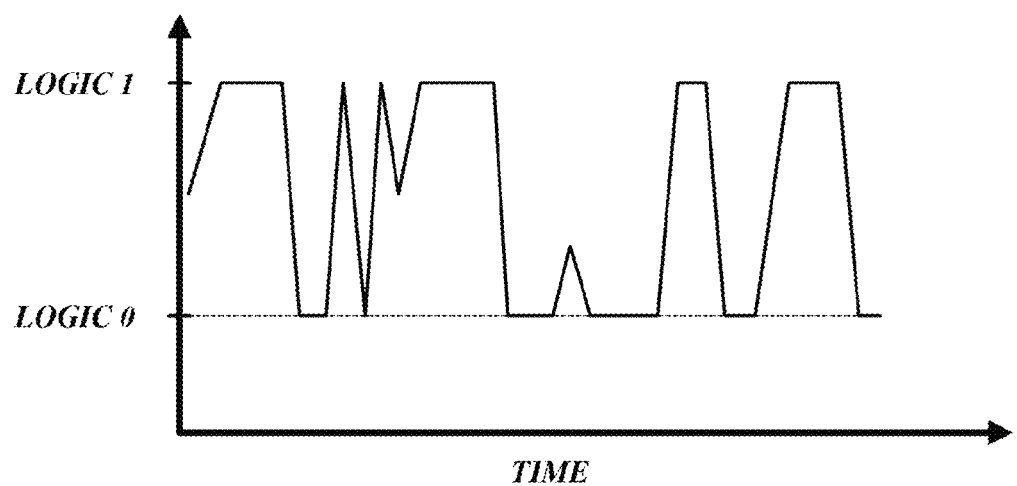

FIGS. 4A and 4B are charts that illustrate a problem that may occur when electrical idle is presented by a differential pair that is being converted to digital logic signaling, according to various aspects of the present disclosure. The axes of FIGS. 4A and 4B represent similar values to those of the axes in FIGS. 3A and 3B, respectively. In FIG. 4A, the differential pair is presenting an electrical idle signal similar to the electrical idle signal defined in the USB Specifications. While the differential pair conductors are kept nominally at the same voltage, the USB Specifications may allow for up to 10 mV of variance from the base voltage.

FIG. 4B illustrates a typical conversion of the electrical idle signal illustrated in FIG. 4A to a digital signal. In some embodiments, the optical transceiver may simply generate a logical "1" output signal or a logical "0" output signal based on the relative voltage of the differential conductors regardless of the magnitude of voltage difference between the differential conductors. Hence, even the very small voltage differentials presented during electrical idle may result in unpredictable output from the optical transceiver. This unpredictable output from the optical transceiver may be misinterpreted by a receiving extension device as LFPS signaling, thus causing undesired behavior.

Figure 5:
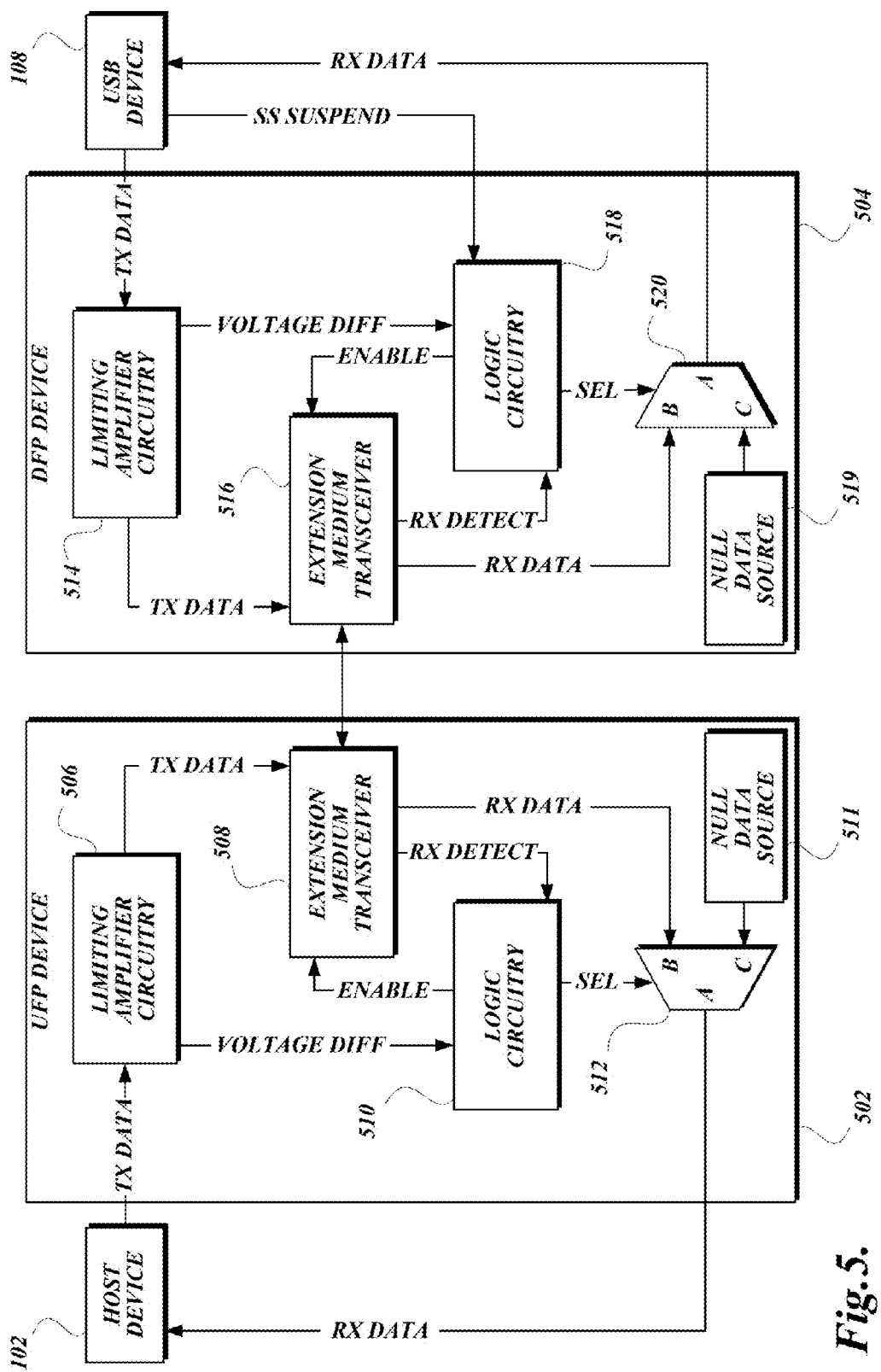
FIG. 5 is a block diagram that illustrates an exemplary embodiment of an exemplary upstream USB extension device and an exemplary downstream USB extension device according to various aspects of the present disclosure.

FIG. 5 is a block diagram that illustrates an exemplary embodiment of an exemplary upstream USB extension device and an exemplary downstream USB extension device according to various aspects of the present disclosure. Herein, the terms "upstream USB extension device" and "UFP device" are used interchangeably, as are the terms "downstream USB extension device" and "DFP device." Hence, the upstream USB extension device illustrated in FIG. 5 is referred to as UFP device 502, and the downstream USB extension device illustrated in FIG. 5 is referred to as DFP device 504.

The UFP device 502 includes limiting amplifier circuitry 506, an extension medium transceiver 508, logic circuitry 510, and a multiplexer 512. As illustrated, a host device 102 is coupled to the UFP device 502 via an upstream facing port of the UFP device 502 (not illustrated). In other embodiments, other types of USB devices having downstream facing ports, such as hub devices and/or the like, may be coupled to the UFP device 502 instead of a host device 102. The host device 102 and the upstream facing port are communicatively coupled, such that at least a data transmit differential pair of the host device 102 and a data receive differential pair of the host device 102 are communicatively coupled to the upstream facing port of the UFP device 502. Signals from the data transmit differential pair of the host device 102 are provided to the limiting amplifier circuitry 506. Output signals from the multiplexer 512 are provided to the data receive differential pair of the host device 102.

The limiting amplifier circuitry 506 receives the signals from the data transmit differential pair of the host device 102, and provides an amplified version of the signals to the extension medium transceiver 508. The limiting amplifier circuitry 506 also determines a voltage differential presented by the data transmit differential pair, and transmits a voltage differential signal to the logic circuitry 510. In some embodiments, the voltage differential signal includes a numeric value that represents the voltage differential or the individual voltages of each conductor of the differential pair. In some embodiments, the voltage differential signal may include a Boolean value that represents whether or not the voltage differential represents an electrical idle signal from the host device 102.

The extension medium transceiver 508 receives the data transmit differential signals from the limiting amplifier circuitry 506. When transmission functionality of the extension medium transceiver 508 is enabled, the extension medium transceiver 508 converts the differential signal into a format suitable for transmission over the extension medium 90, and transmits the converted signal over the extension medium to the DFP device 504. In some embodiments, the extension medium 90 is a medium suitable for serial transmission, such as fiber optic cable, coaxial cable, and/or the like, and the extension medium transceiver 508 converts the differential signal into a serial signal to be transmitted over the extension medium 90.

While the UFP device 502 is active, receive functionality of the extension medium transceiver 508 is also active. The extension medium transceiver 508 is configured to receive signals from the extension medium 90, to convert the received signals into a differential signal, and to provide the received differential signal to the multiplexer 512. In some embodiments, the extension medium transceiver 508 is also configured to determine whether or not an incoming signal is detected, and to provide a signal having a value indicating whether or not an incoming signal is detected to the logic circuitry 510. In other embodiments, the extension medium transceiver 508 may simply provide the received signal, if any, to the logic circuitry 510, and the logic circuitry 510 may make the determination as to whether a valid signal is being received.

In general, the logic circuitry 510 is configured to control the multiplexer 512 and the extension medium transceiver 508 such that, when the host device 102 and/or the USB device 108 is in a suspend state, invalid data is not transmitted over the extension medium 90 and/or is not interpreted as a wakeup signal by the host device 102 and/or the USB device 108. In some embodiments, the logic circuitry 510 may cause the multiplexer 512 to connect a null data source 511 instead of the output of the extension medium transceiver 508 to the data receive differential pair of the host device 102 upon detecting that the host device 102 is in a suspend state or is otherwise presenting an electrical idle signal on its data transmit differential pair. In some embodiments, the null data source 511 may be a ground conductor. In some embodiments, the null data source 511 may include a signal generator configured to generate a differential signal that may be detected but ignored by the host device 102 and USB device. As a nonlimiting example, one such embodiment of the null data source 511 may include a signal generator that produces a constant differential signal with a frequency of about 30 kilohertz. In some embodiments, the logic circuitry 510 may also disable the transmission functionality of the extension medium transceiver 508 upon determining that the host device 102 has been in the suspend state or has been presenting electrical idle for at least a predetermined period of time. Further details of the operation of the logic circuitry 510 are discussed below with respect to FIGS. 6-8.

In some embodiments, the DFP device 504 may be configured substantially similarly to the UFP device 502. The DFP device 504 also includes limiting amplifier circuitry 514, an extension medium transceiver 516, logic circuitry 518, and a multiplexer 520. A USB device 108 is coupled to the DFP device 504 via a downstream facing port of the DFP device 504 (not illustrated). In other embodiments, other types of USB devices having upstream facing ports, such as hub devices and/or the like, may be coupled to the DFP device 504 instead of a USB device 108. The USB device 108 and the downstream facing port are communicatively coupled, such that at least a data transmit differential pair of the USB device 108 and a data receive differential pair of the USB device 108 are communicatively coupled to the downstream facing port of the DFP device 508. Signals from the data transmit differential pair of the USB device 108 are provided to the limiting amplifier circuitry 514. Output signals from the multiplexer 520 are provided to the data receive differential pair of the USB device 108. In some embodiments, signals from the data transmit differential pair of the USB device 108 may also be provided to the logic circuitry 518, so that the logic circuitry 518 may detect suspend confirmation signals transmitted by the USB device 108. Otherwise, the limiting amplifier circuitry 514, extension medium transceiver 516, logic circuitry 518, and multiplexer 520 are interconnected and interact in ways that are substantially similar to those discussed above with respect to the limiting amplifier circuitry 506, the extension medium transceiver 508, the logic circuitry 510, and the multiplexer 512 of the UFP device 502, and so are not described further herein for the sake of brevity.

In some embodiments, the limiting amplifier circuitry 506, 514, the extension medium transceivers 508, 516, the logic circuitry 510, and the multiplexers 512, 520 embody logic described below, and may be implemented using any suitable technology, such as within a logic device such as a PLD, an ASIC, a FPGA, and/or the like. In other embodiments, these components may be implemented within a computing device having at least one processor and a memory containing computer-executable instructions that, if executed by the at least one processor, cause the UFP device 502 or DFP device 504 to perform the actions discussed below; a dedicated digital hardware device implemented, for example, as a state machine configured to perform the actions described; within an application specific processor; and/or within any other suitable computing device. In some embodiments, at least some of the components may be provided by an off-the-shelf device that provides at least some of the described functionality, such as a pre-existing fiber optic transceiver component, a pre-existing multiplexer component, and/or the like. One example of a suitable fiber optic transceiver component is the FTLF8528P3BCV transceiver produced by Finisar Corporation, though any other suitable fiber optic transceiver may be used instead.

Figure 6:
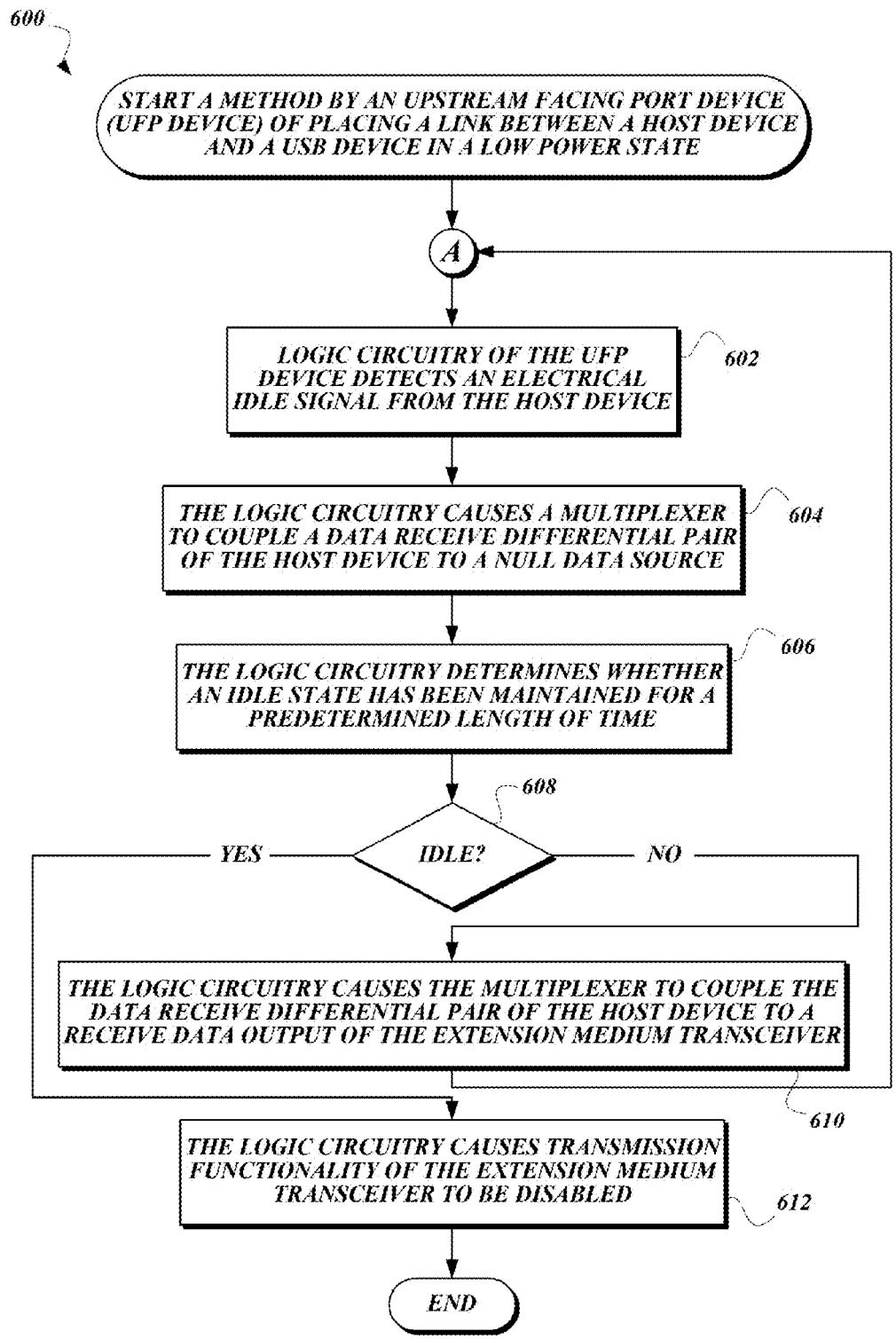
FIG. 6 is a flowchart that illustrates an exemplary embodiment of a method performed by a UFP device of placing a link between a host device and a USB device in a low power state, according to various aspects of the present disclosure.

FIG. 6 is a flowchart that illustrates an exemplary embodiment of a method 600 performed by a UFP device 502 of placing a link between a host device 102 and a USB device 108 in a low power state, according to various aspects of the present disclosure. In some embodiments, the low power state may be a suspend state or U3 state as defined in the USB Specifications, though other states that feature electrical idle signals may also be featured. For purposes of the discussion herein, it is assumed that, before the start of the method 600, the transmission functionality of the extension medium transceiver 508 is enabled and the multiplexer 512 is configured to couple the receive data output of the extension medium transceiver 508 to the data receive differential pair of the host device 102, such that active data transmissions may occur between the host device 102 and a USB device 108 coupled to a DFP device 504 located across the extension medium 90.

From a start block, the method 600 proceeds to a continuation terminal ("terminal A"), and then to block 602, where logic circuitry 510 of the UFP device 502 detects an electrical idle signal from a host device 102. Next, at block 604, the logic circuitry 510 causes a multiplexer 512 to couple a data receive differential pair of the host device 102 to a null data source 511. In the illustrated embodiment, the multiplexer 512 switches its input from input B to input C based on a select signal provided by the logic circuitry 510, thus changing the source coupled to the data receive differential pair of the host device 102.

At block 606, the logic circuitry 510 determines whether an idle state has been maintained for a predetermined length of time. In some embodiments, the determined idle state may be electrical idle presented by the data transmit differential pair of the host device 102, though other idle conditions may also be considered. In some embodiments, the predetermined time may be about 2 ms, to prevent unnecessary cycling on and off of the extension medium transceiver 508 in cases where the electrical idle state is only presented for a short time, which may be a common occurrence.

At decision block 608, a test is performed based on the determination of whether the idle state had been maintained for the predetermined length of time. If the result of the test at decision block 608 is NO, then the connection between the host device 102 and the device across the extension medium 90 may have left the idle state, or may have never completely entered the idle state. Accordingly, the method 600 proceeds to block 610, where the logic circuitry 510 causes the multiplexer 512 to couple the data receive differential pair of the host device 102 to a receive data output of the extension medium transceiver 512. In the illustrated embodiment, the multiplexer 512 switches its input back to input B based on a select signal provided by the logic circuitry 510, to reconnect the receive data signal from the extension medium transceiver 508 to the data receive differential pair of the host device 102. The method 600 then returns to terminal A.

Otherwise, if the result of the test at decision block 608 is YES, then the connection is still in an idle state after the predetermined length of time. Accordingly, the method 600 proceeds to block 612, where the logic circuitry 510 causes transmission functionality of the extension medium transceiver 508 to be disabled. In some embodiments, receive functionality of the extension medium transceiver 508 remains enabled despite the state of the transmission functionality of the extension medium transceiver 508. The method 600 then proceeds to an end block and terminates. Upon termination of the method 600, the connection between the host device 102 and a device located across the extension medium 90 is in a low power suspend or idle state, and will not improperly leave the low power suspend or idle state due to noise introduced by or detected by the extension medium transceiver 508.

Figure 7:
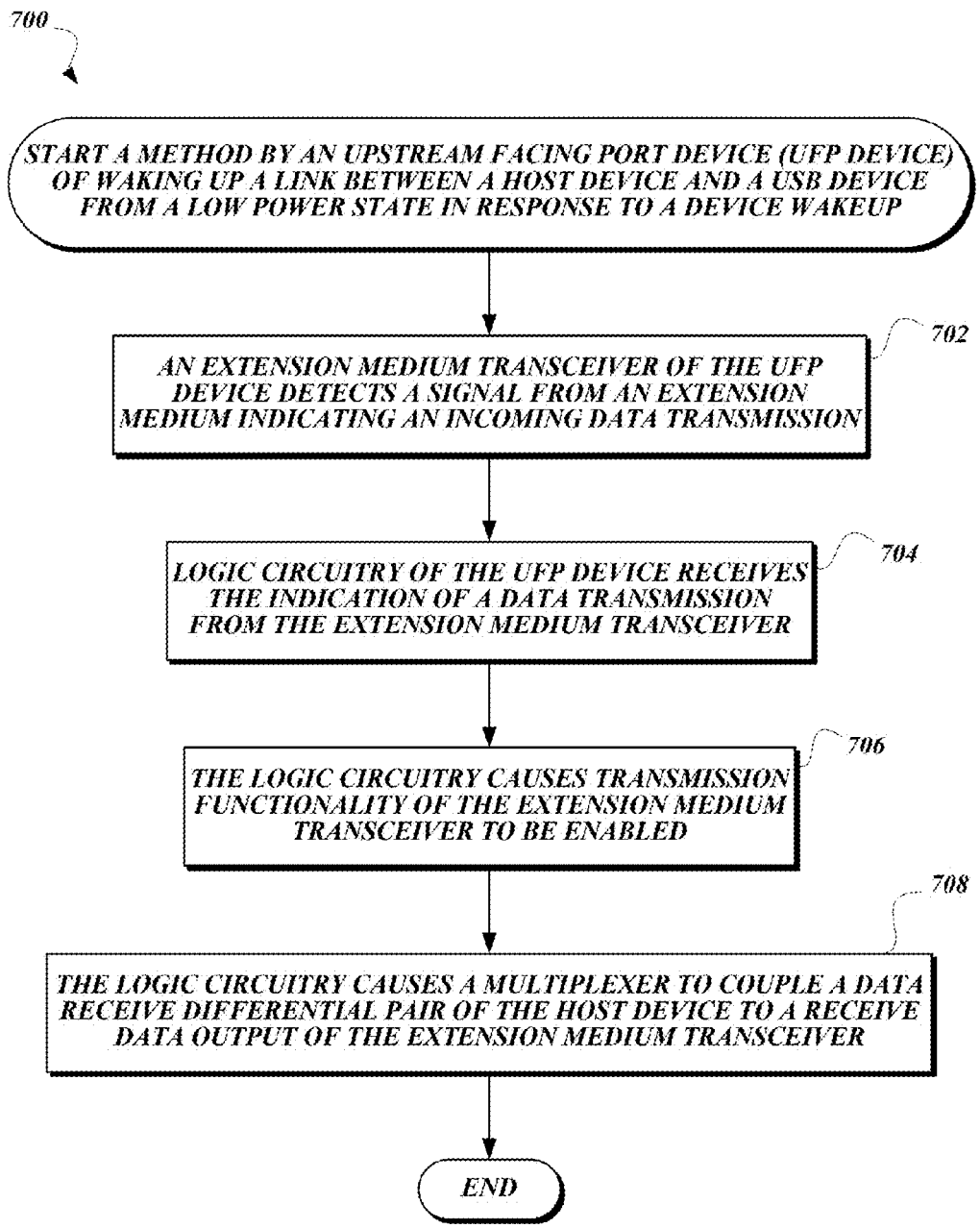
FIG. 7 is a flowchart that illustrates an exemplary embodiment of a method performed by a UFP device of waking up a link between a host device and a USB device from a low power state in response to a device wakeup, according to various aspects of the present disclosure.

FIG. 7 is a flowchart that illustrates an exemplary embodiment of a method 700 performed by a UFP device 502 of waking up a link between a host device 102 and a USB device 108 from a low power state in response to a device wakeup, according to various aspects of the present disclosure. For purposes of the discussion herein, it is assumed that, before the start of the method 700, the UFP device 502 has performed a method similar the method 600 described above of placing the link in a low power state. Accordingly, a transmission function of the extension medium transceiver 508 is disabled, and the input of the multiplexer 512 is coupled to the null data source 511.

From a start block, the method 700 proceeds to block 702, where the extension medium transceiver 508 of the UFP device 502 detects a signal from an extension medium 90 indicating an incoming data transmission. As described above, while in the low power or suspend state, the transmission function of the extension medium transceiver 508 is disabled, as is the transmission function of the extension medium transceiver 516 of the DFP device 504. Accordingly, in some embodiments, any signal received by the extension medium transceiver 508 from the extension medium 90 may be interpreted as an incoming data transmission. In some embodiments, further processing may be performed to determine whether an incoming signal detected by the extension medium transceiver 508 is a valid signal. For example, the transmission functionality of the extension medium transceiver 516 on the other side of the extension medium 90 may be cycled on and off in a predetermined handshake pattern, and the extension medium transceiver 508 may detect this handshake pattern to determine that an incoming data transmission has been detected. At block 704, the logic circuitry 510 receives the indication of a data transmission from the extension medium transceiver 508. In some embodiments, the extension medium transceiver 508 may instead provide an unprocessed signal received from the extension medium 90 in a format acceptable by the logic circuitry 510, and the logic circuitry 510 may itself detect whether the unprocessed signal indicates an incoming data transmission.

Once the logic circuitry 510 has determined that there is an incoming data transmission, the method 700 proceeds to block 706, where the logic circuitry 510 causes transmission functionality of the extension medium transceiver 508 to be enabled. Next, at block 708, the logic circuitry 510 causes the multiplexer 512 to couple the data receive differential pair of the host device 102 to the receive data output of the extension medium transceiver 508. In the illustrated embodiment, the multiplexer 512 switches its input from input C to input B based on a select signal provided by the logic circuitry 510, thus changing the source coupled to the data receive differential pair of the host device 102.

The method 700 then proceeds to an end block and terminates. Upon termination, the extension medium transceiver 508 is again transmitting data transmitted by the host device 102 over the extension medium 90, and the multiplexer 512 is transmitting data received by the extension medium transceiver 508 to the host device 102. Because these connections are active, the host device 102 and a device accessible across the extension medium 90 may exit the low power or suspend state as described in the USB Specifications with regard to a device wakeup.

Figure 8:
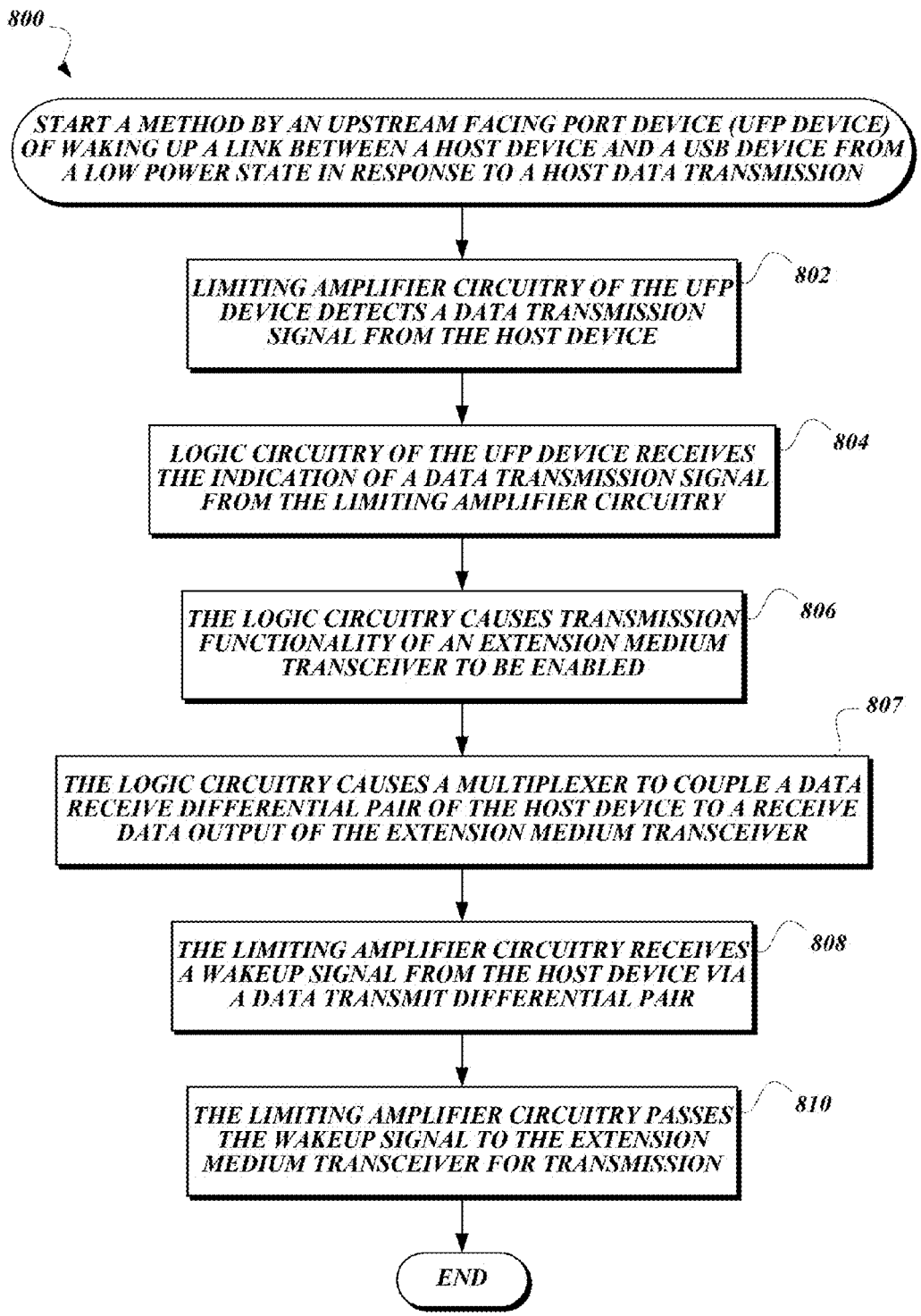
FIG. 8 is a flowchart that illustrates an exemplary embodiment of a method by a UFP device of waking up a link between a host device and a USB device from a low power state in response to a data transmission from the host device, according to various aspects of the present disclosure.

The method 700 described above relates to a process of re-enabling the connections based on a signal received from the extension medium 90. In contrast, FIG. 8 is a flowchart that illustrates an exemplary embodiment of a method 800 by a UFP device 502 of waking up a link between a host device 102 and a USB device 108 from a low power state in response to a data transmission from the host device 102, according to various aspects of the present disclosure. In other words, whereas the method 700 re-enables the connections in response to signals received from the extension medium 90, method 800 re-enables the connections in response to signals transmitted by the host device 102.

From a start block, the method 800 proceeds to block 802, where the limiting amplifier circuitry 506 of the UFP device 502 detects a data transmission signal from the host device 102. In some embodiments, the data transmission signal may be detected by detecting a differential voltage on the data transmission differential pair other than a voltage that indicates electrical idle. At block 804, the logic circuitry 510 of the UFP device 502 receives the indication of a data transmission signal from the limiting amplifier circuitry 506. In some embodiments, the limiting amplifier circuitry 506 may provide a Boolean signal that indicates whether or not an electrical idle signal is detected, while in other embodiments, the limiting amplifier circuitry 506 may provide the respective voltages to the logic circuitry 510 so that the logic circuitry 510 may determine the presence or absence of an electrical idle signal.

At block 806, the logic circuitry 510 causes transmission functionality of the extension medium transceiver 508 to be enabled. As discussed above, enabling the transmission functionality of the extension medium transceiver 508 may include cycling the transmission functionality on and off in a predetermined handshake pattern to indicate to the DFP device 504 that a valid data transmission is upcoming. Next, at block 807, the logic circuitry 510 causes the multiplexer 512 to couple the data receive differential pair of the host device 102 to a receive data output of the extension medium transceiver 508. At block 808, the limiting amplifier circuitry 506 receives a wakeup signal from the host device 102 via the data transmit differential pair of the host device 102, and at block 810, the limiting amplifier circuitry 506 passes the wakeup signal to the extension medium transceiver 508 for transmission on the extension medium 90.

The method 800 then proceeds to an end block and terminates. Upon termination, the extension medium transceiver 508 is again transmitting data transmitted by the host device 102 over the extension medium 90, and the multiplexer 512 is transmitting data received by the extension medium transceiver 508 to the host device 102. Because these connections are active, the host device 102 and a device accessible across the extension medium 90 may leave the low power or suspend state as described in the USB Specifications with regard to a host-controlled exit from the low power or suspend state.

The methods above describe actions performed by a UFP device 502, but one of ordinary skill in the art will recognize that similar methods may be performed by a similarly configured DFP device 504, with incoming wakeup signals from the host device 102 being detected by the extension medium transceiver 516 as the device wakeup signals were detected by the extension medium transceiver 508, and with non-electrical idle signals from the USB device 108 being detected by the limiting amplifier circuitry 514 and/or the logic circuitry 518 as the similar signals were detected from the host device 102 by the limiting amplifier circuitry 506 and the logic circuitry 510. In some embodiments, the method QC00 may be performed by both a UFP device and a DFP device at substantially the same time in order to prevent either the host device 102 or the USB device 108 from being improperly removed from the idle state.

In some embodiments, the DFP device 504 may additionally be configured to detect that the USB device 108 has entered a low power or suspend state by detecting a SuperSpeed suspend confirmation signal. In some embodiments, the SuperSpeed suspend confirmation signal may be one or more of the U3 state transition signals described in Section 7.2.4.2.4 of Revision 1.0 of the USB 3.0 Specification, dated Jun. 6, 2011, and incorporated herein by reference in its entirety for all purposes. Signals that may be detected by the logic circuitry 510 to indicate suspend confirmation include transmission of the described LAU signal, and/or receipt of the described LPMA signal.

Figure 9:
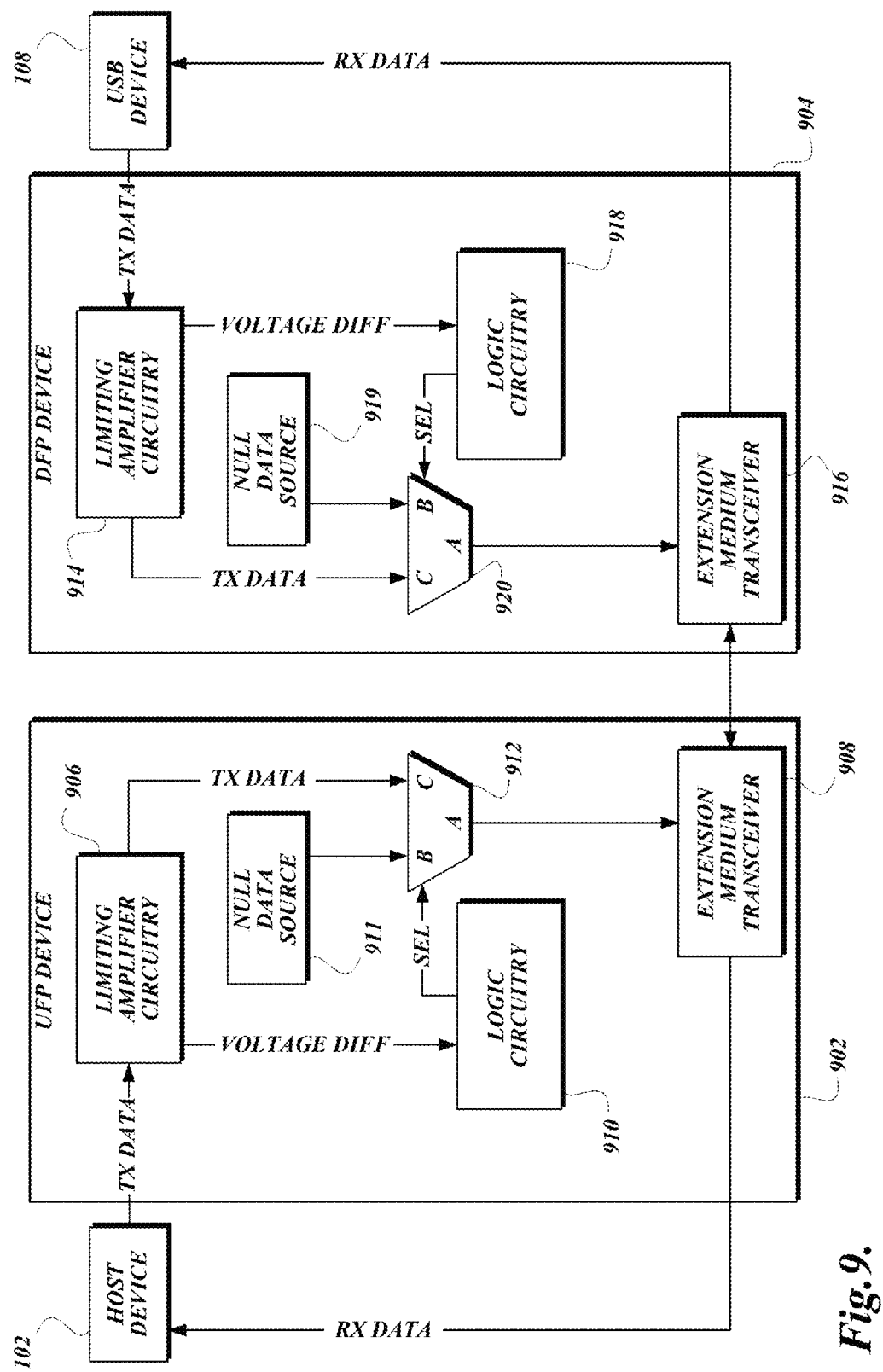
FIG. 9 is a block diagram that illustrates another exemplary embodiment of a UFP device and a DFP device according to various aspects of the present disclosure.

FIG. 9 is a block diagram that illustrates another exemplary embodiment of a UFP device 902 and a DFP device 904 according to various aspects of the present disclosure. While the previously described embodiments used a multiplexer to control signals provided to a data receive differential pair of a device, the embodiment illustrated in FIG. 9 uses a multiplexer to control signals provided for transmission over the extension medium.

Similar to the discussion above, the UFP device 902 includes an upstream facing port (not illustrated), to which a host device 102 may be communicatively coupled, and the DFP device 904 includes a downstream facing port (not illustrated), to which a USB device 108 may be communicatively coupled. The UFP device 902 includes limiting amplifier circuitry 906 similar to the limiting amplifier circuitry QC06 illustrated and described above. Signals from a data transmit differential pair of the host device 102 are provided to the limiting amplifier circuitry 906, which provides an amplified version of the signals to a multiplexer 912. The limiting amplifier circuitry 906 also determines a voltage differential presented by the data transmit differential pair, and transmits a voltage differential signal to the logic circuitry 910. In some embodiments, the voltage differential signal includes a numeric value that represents the voltage differential or the individual voltages of each conductor of the differential pair. In some embodiments, the voltage differential signal may include a Boolean value that represents whether or not the voltage differential represents an electrical idle signal from the host device 102.

The logic circuitry 910 is configured to provide a select signal to the multiplexer 912. The select signal determines whether an output of the multiplexer 912 will be coupled to the data transmit signal output by the limiting amplifier circuitry 906, or to a null data source 911. Similar to the null data source QC11 described above, the null data source 911 may be a ground source, may be a signal generator configured to generate a differential signal that will be ignored by the receiving device, or any other suitable signal generator.

The output of the multiplexer 912 is a differential signal that is provided to the extension medium transceiver 908 for transmission on the extension medium 90 in a suitable format. Signals received by the extension medium transceiver 908 from the extension medium 90 are converted to a differential signal and provided to a data receive differential pair of the host device 102.

The logic circuitry 910 determines whether input C (the data transmit signal) or input B (the null signal) will be selected based on the determination of whether an electrical idle signal is presented by the host device 102 on the data transmit differential pair. If the logic circuitry 910 determines that the host device 102 is presenting an electrical idle signal, the logic circuitry 910 will provide a select signal to the multiplexer 912 that causes the null signal (input B) to be selected. If the logic circuitry 910 does not determine that the host device 102 is presenting an electrical idle signal, the logic circuitry 910 will provide a select signal to the multiplexer 912 that causes the data transmit signal (input C) to be selected.

The DFP device 904, which also includes limiting amplifier circuitry 914, a multiplexer 920, logic circuitry 918, a null data source 919, and an extension medium transceiver 916, is configured similarly to the UFP device 902, but detects electrical idle signals presented by the USB device 108.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A USB extension device, comprising:
    a USB port;
    an extension medium transceiver configured to:
        receive outgoing differential signals from the USB port;
        transmit outgoing signals representing the outgoing differential signals over an extension medium; and
        receive incoming signals from the extension medium representing incoming differential signals; and
    a multiplexer selectively configurable to:
        transmit the incoming differential signals from the extension medium transceiver to the USB port while configured in a first state; and
        transmit a signal from a null data source to the USB port while configured in a second state.

2. The USB extension device of claim 1, further comprising logic circuitry configured to control whether the multiplexer is in the first state or the second state.

3. The USB extension device of claim 2, wherein the logic circuitry is further configured to cause the multiplexer to be in the first state in response to detecting an electrical idle differential signal from the USB port.

4. The USB extension device of claim 2, wherein the logic circuitry is further configured to cause the multiplexer to be in the second state in response to detecting a valid incoming signal from the extension medium transceiver.

5. The USB extension device of claim 2, wherein the logic circuitry is further configured to control whether extension medium transmission functionality of the extension medium transceiver is enabled or disabled.

6. The USB extension device of claim 5, wherein the logic circuitry is further configured to disable the extension medium transmission functionality of the extension medium transceiver after a predetermined period of time has elapsed since detecting the electrical idle differential signal from the USB port.

7. The USB extension device of claim 1, wherein the null data source includes at least one of a ground contact and a constant frequency signal generator.

8. The USB extension device of claim 1, wherein the extension medium includes one of a fiber optic cable and a coaxial cable.

9. The USB extension device of claim 1, wherein the USB port is an upstream facing port coupled to a host device or a hub device.

10. The USB extension device of claim 1, wherein the USB port is a downstream facing port coupled to a peripheral device or a hub device.

11. A method implemented in a USB extension device of translating USB signals for transmission to and reception from an extension medium, wherein the USB extension device is coupled via a USB port to a device, the method comprising:
    coupling a data receive differential pair of the USB port to a null data source in response to determining that the device is in a suspend state; and
    coupling the data receive differential pair of the USB port to a data receive output of an extension medium transceiver in response to determining that either:
        the device coupled to the USB port is not in the suspend state; or
        a valid signal is being received from the extension medium.

12. The method of claim 11, wherein the device coupled to the USB port of the USB extension device is one of a host device, a hub device, or a peripheral USB device.

13. The method of claim 11, wherein determining that the device is in a suspend state includes detecting an electrical idle state on a data transmit differential pair of the USB port.

14. The method of claim 11, wherein determining that the device is in a suspend state includes detecting a suspend acknowledgement signal transmitted by the device.

15. The method of claim 14, wherein the suspend acknowledgement signal includes an LAU packet.

16. The method of claim 11, further comprising:
    disabling data transmission functionality of the extension medium transceiver in response to determining that the device has been in the suspend state for a predetermined period of time.

17. The method of claim 16, further comprising:
    enabling data transmission functionality of the extension medium transceiver in response to at least one of:

determining that the device is not in the suspend state; and
detecting a valid signal from the extension medium.

18. A USB extension device, comprising:
a USB port; and
logic circuitry configured to cause a null signal to be presented to an extension medium transceiver for transmission over an extension medium in response to detecting an electrical idle differential signal from the USB port.

19. The USB extension device of claim 18, wherein the null signal is a substantially constant frequency differential signal.

20. The USB extension device of claim 19, wherein a frequency of the substantially constant frequency differential signal is about 30 kilohertz.

* * * * *